US012505786B2

(12) United States Patent
Cherng et al.

(10) Patent No.: US 12,505,786 B2
(45) Date of Patent: Dec. 23, 2025

(54) POWER-SAVING ELECTRONIC DEVICE AND DISPLAY DEVICE

(71) Applicant: InnoLux Corporation, Miao-Li County (TW)

(72) Inventors: Yi-Shiuan Cherng, Miao-Li County (TW); Chia-Hao Tsai, Miao-Li County (TW); Ming-Jou Tai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/604,530

(22) Filed: Mar. 14, 2024

(65) Prior Publication Data

US 2024/0346986 A1 Oct. 17, 2024

Related U.S. Application Data

(60) Provisional application No. 63/458,443, filed on Apr. 11, 2023.

(30) Foreign Application Priority Data

Dec. 22, 2023 (CN) ......................... 202311773625.7

(51) Int. Cl.
*G09G 3/32* (2016.01)

(52) U.S. Cl.
CPC ....... *G09G 3/32* (2013.01); *G09G 2300/0408* (2013.01); *G09G 2310/0202* (2013.01); *G09G 2310/0264* (2013.01); *G09G 2330/021* (2013.01)

(58) Field of Classification Search
CPC ... G09G 2300/0408; G09G 2310/0202; G09G 2310/0264; G09G 2330/021
See application file for complete search history.

(56) References Cited

U.S. PATENT DOCUMENTS

| | | | | |
|---|---|---|---|---|
| 6,384,806 B1 * | 5/2002 | Matsueda | ............ | G09G 3/3688 345/95 |
| 10,643,565 B2 | 5/2020 | Park | | |
| 10,861,370 B2 | 12/2020 | Liu | | |
| 2003/0160775 A1 * | 8/2003 | Kumada | .............. | G09G 3/3648 345/209 |
| 2019/0259324 A1 * | 8/2019 | Liu | ...................... | G09G 3/2003 |

FOREIGN PATENT DOCUMENTS

| | | |
|---|---|---|
| CN | 106328077 B | 5/2019 |
| CN | 109637414 B | 7/2022 |

* cited by examiner

*Primary Examiner* — Afroza Chowdhury
(74) *Attorney, Agent, or Firm* — Winston Hsu

(57) ABSTRACT

An electronic device includes a substrate, a first signal line, and a driving circuit. The first signal line and the driving circuit are coupled to each other and are disposed on the substrate. The driving circuit includes at least one switch element and a driving element. The switch element includes a first control end. The driving element is coupled to the first control end to provide a first voltage signal at the first control end. The first voltage signal has a first maximum amplitude. The first maximum amplitude is greater than or equal to 8 volts and less than or equal to 22 volts.

14 Claims, 8 Drawing Sheets

POWER-SAVING ELECTRONIC DEVICE AND DISPLAY DEVICE

CROSS REFERENCE TO RELATED APPLICATION

This application claims the benefit of U.S. Provisional Application No. 63/458,443, filed on Apr. 11, 2023. The content of the application is incorporated herein by reference.

BACKGROUND OF THE DISCLOSURE

1. Field of the Disclosure

The present disclosure is related to an electronic device and a display device, and more particularly, to a power-saving electronic device and a power-saving display device.

2. Description of the Prior Art

While technological advancements have propelled high-resolution displays to market dominance, this progress comes at a price. An increase in the resolution of a display device necessitates a corresponding increase in the number of internal components. Consequently, a larger power input is required to drive these additional components, resulting in increased power consumption. Furthermore, the increased number of components in the display device also leads to a higher load on the drive signal. This could potentially compromise signal transmission efficiency and adversely affect the quality of the display. Additionally, the need to operate at higher frequencies could potentially shorten the lifespan of the display device.

SUMMARY OF THE DISCLOSURE

According to some embodiments, the present disclosure discloses an electronic device comprising a substrate, a first signal line, and a driving circuit. The first signal line and the driving circuit are coupled to each other and are disposed on the substrate. The driving circuit comprises at least one switch element and a driving element. The switch element comprises a first control end. The driving element is coupled to the first control end to provide a first voltage signal at the first control end, and the first voltage signal has a first maximum amplitude. The first maximum amplitude is greater than or equal to 8 volts and less than or equal to 22 volts.

According to other embodiments, the present disclosure discloses a display device comprising a substrate, an active area, a first signal line, and a driving circuit. The active area, the first signal line and the driving circuit are disposed on the substrate. The driving circuit is coupled to the active area and the first signal line, and configured to drive the active area to display images. The driving circuit comprises at least one switch element and a driving element. The switch element comprises a first control end. The driving element is coupled to the first control end to provide a first voltage signal at the first control end, and the first voltage signal has a first maximum amplitude. The first maximum amplitude is greater than or equal to 8 volts and less than or equal to 22 volts.

These and other objectives of the present disclosure will no doubt become obvious to those of ordinary skill in the art after reading the following detailed description of the embodiment that is illustrated in the various figures and drawings.

DETAILED DESCRIPTION

Figure 1:
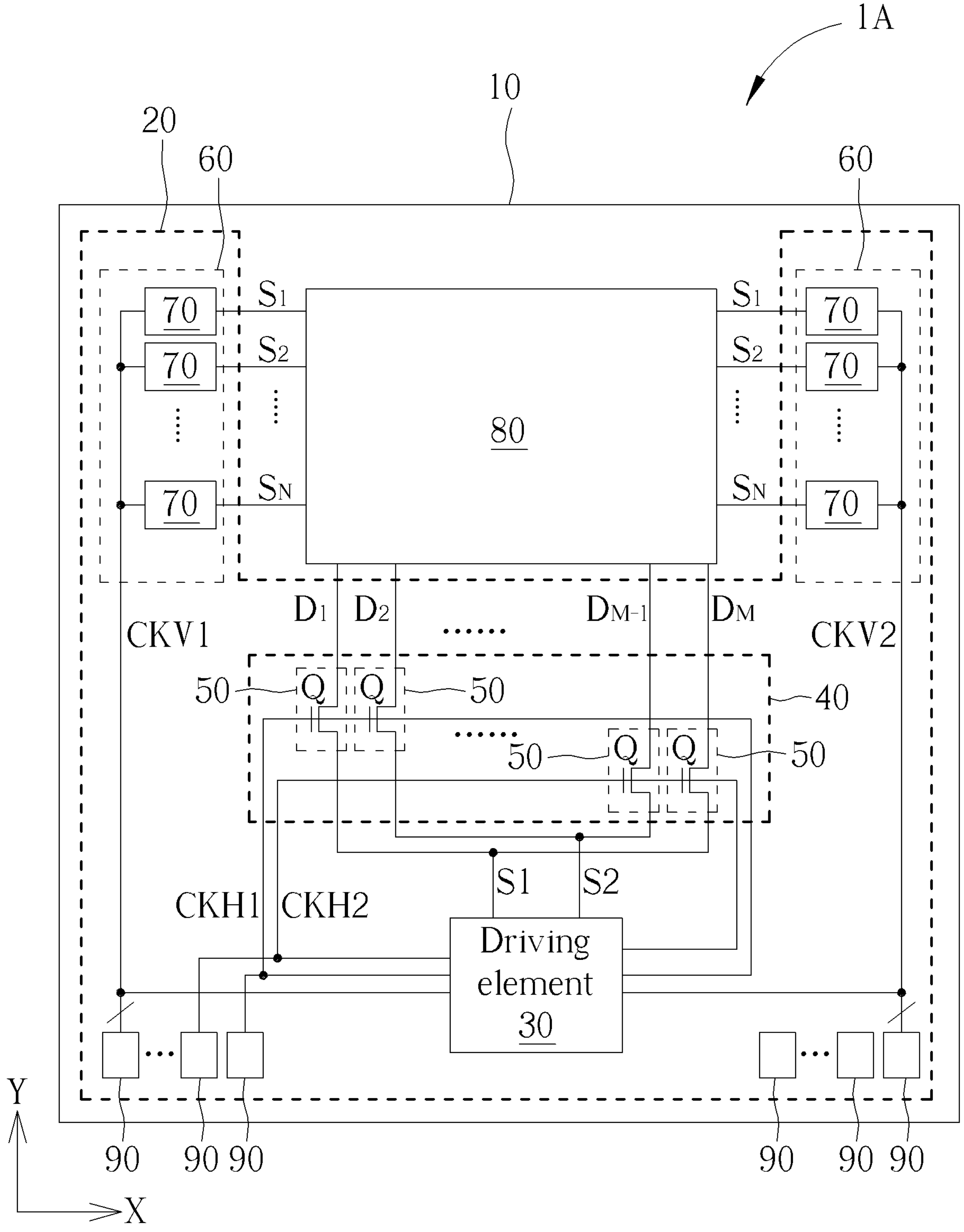
FIG. 1 is a schematic diagram of an electronic device according to an embodiment of the disclosure.

The present disclosure may be understood by reference to the following detailed description, taken in conjunction with the drawings as described below. It is noted that, for purposes of illustrative clarity and being easily understood by the readers, various drawings of the present disclosure show a portion of an electronic device in the present disclosure, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to "on another component", it may be directly on this another component, or other component (s) may exist between them. On the other hand, when the component is referred to "directly on another component (or the variant thereof)", any component does not exist between them. Furthermore, when the corresponding component is referred to "on another component", the corresponding component and the another component have a disposition relationship along a top-view/vertical direction, the corresponding component may be below or above the another component, and the disposition relationship along the top-view/vertical direction are determined by an orientation of the device.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented. In addition, when the component is referred to "be coupled to/with another component (or the variant thereof)", it may be directly connected to this another component, or may be indirectly connected (such as electrically connected) to this another component through other component(s).

In the present disclosure, when a component is "electrically connected to" another component, an electrical signal would flow between these two components at certain times during normal operation. In the present disclosure, when a component is "couple to" another component, an electrical signal would flow between these two components within a designated time. In the present disclosure, when a component is "disconnected from" another component, an electrical signal would not flow between these two components within a designated time.

In the description and following claims, the term "horizontal direction" generally means a direction parallel to a horizontal plane, the term "horizontal plane" generally means a surface parallel to a direction X and direction Y in the drawings.

The terms "about", "approximately", "substantially", "equal", or "same" generally mean within ±20% of a given value or range, or mean within ±10%, ±5%, ±3%, ±2%, ±1%, or ±0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

In the present disclosure, an electronic device may include a display device, a light-emitting device, a backlight device, a virtual reality device, an augmented reality (AR) device, an antenna device, a sensor device, a splicing device, or any combination thereof, but not limited to these. The display device can be a non-self-luminous display or a self-luminous display as needed, and can be a color display or a monochrome display as needed. The antenna device can be a liquid crystal type antenna device or a non-liquid crystal type antenna device, the sensor device can be a sensor for sensing capacitance, light, heat, or ultrasound, and the splicing device can be a display splicing device or an antenna splicing device, but not limited to these. The electronic components in the electronic device can include passive components and active components, such as capacitors, resistors, inductors, diodes, transistors, etc. Diodes can include light-emitting diodes (LEDs) or photodiodes. Light-emitting diodes can include organic light-emitting diodes (OLEDs), sub-millimeter light-emitting diodes (mini LEDs), micro light-emitting diodes (micro LEDs), or quantum dot light-emitting diodes (quantum dot LEDs), but not limited to these. Transistors can include top gate thin film transistors, bottom gate thin film transistors, or dual gate thin film transistors, but not limited to these. The electronic device can also include fluorescence materials, phosphor materials, quantum dot (QD) materials, or other suitable materials as needed, but not limited to these. The electronic device can have a driving system, a control system, a light source system, etc., and other peripheral systems to support the display device, antenna device, wearable device (e.g., including augmented reality or virtual reality devices), vehicle-mounted device (e.g., including car windshields), or splicing device.

In some embodiments, the electronic panel can be a type of electronic device, and the electronic panel can at least be a combination of a display device and a touch sensing device, so that the electronic panel has at least display and touch sensing functions. The following text uses the electronic device as an example to explain the present disclosure, but the design of the present disclosure can be applied to any suitable electronic device.

In addition, the switch element mentioned in the present disclosure can be any electronic component with a switching effect. For example, the switch element can be a thin-film transistor. For instance, the thin-film transistor can be a top gate thin-film transistor, a bottom gate thin-film transistor, a dual gate thin-film transistor, or other suitable types of transistors.

Please refer to FIG. 1, which is a schematic diagram of an electronic device 1A according to an embodiment of the present disclosure. The electronic device 1A comprises a substrate 10, a driving circuit 20, a plurality of scan lines $S_1$ to $S_N$, a plurality of data lines $D_1$ to $D_M$, and an active area (AA) 80. N and M are integers greater than 1. The substrate 10 can be rigid or flexible, and the substrate 10 can comprise suitable materials according to its type. For example, the substrate 10 can comprise glass, quartz, ceramic, sapphire, polymers (such as polyimide (PI), polyethylene terephthalate (PET)), other suitable materials, or a combination thereof.

In the present disclosure, the electronic device 1A may comprise at least one conductive layer, at least one insulating layer, at least one semiconductor layer, or a combination thereof, and these layers are set on the substrate 10 to form the electronic components in the electronic device 1A. The conductive layer material may comprise metal, transparent conductive material (such as indium tin oxide (ITO), indium zinc oxide (IZO), etc.), other suitable conductive materials, or a combination thereof. The insulating layer material may comprise silicon oxide (SiOx), silicon nitride (SiNy), silicon oxynitride (SiOxNy), organic insulating materials (such as photoresist), other suitable insulating materials, or a combination thereof. The semiconductor layer material may comprise polysilicon, amorphous silicon, metal-oxide semiconductor, other suitable semiconductor materials, or a combination thereof, but is not limited thereto.

In the present disclosure, the electronic device 1A may also comprise a touch sensing function, which may be implemented by one or more conductive layers, and the electronic device 1A may perform touch sensing in any suitable way. For example, the electronic device 1A may use a capacitive touch sensing module for sensing, such as a self-capacitance touch sensing module or a mutual-capacitance touch sensing module, but not limited thereto.

The driving circuit 20, the scan lines $S_1$ to $S_N$, the data lines $D_1$ to $D_M$, and the active area 80 are all set on the substrate 10. The scan lines $S_1$ to $S_N$ are extended in the X direction, and the data lines $D_1$ to $D_M$ are extended in the Y direction. The active area 80 may display images, and the driving circuit 20 sends signals to the active area 80 through the scan lines $S_1$ to $S_N$ and $D_1$ to $D_M$ to drive the active area 80 to display images. The driving circuit 20 comprises a driving element 30, a data switch circuit 40, and two scan switch circuits 60. The data switch circuit 40 comprises a plurality of data switch elements 50, and each scan switch circuit 60 comprises a plurality of scan switch elements 70. Each data switch element 50 may comprise a transistor Q, the gate of the transistor Q may serve as a control end of the data switch element 50, and is used to receive the data clock signals CKH1 and CKH2 from the driving element 30. A first end (e.g., the source) of the transistor Q is coupled to the driving element 30 and is used to receive data signals S1 and S2 from the driving element 30, and a second end (e.g., the drain) of the transistor Q is coupled to one of the data lines $D_1$ to $D_M$. The scan switch element 70 may comprise at least one transistor, the gate of the transistor may serve as a control end of the scan switch element 70, and is used to receive the scan clock signals CKV1 or CKV2 from the driving element 30, and the source of the transistor is used to receive a scan signal from the driving element 30, and the drain of the transistor is coupled to one of the scan lines $S_1$ to $S_N$. The driving circuit 20 may also comprise a plurality of test pads 90, which are used to connect to an external test device, to receive and/or send test signals from the external test device, and to perform related tests on the electronic device 1A. In an embodiment, the test pads 90 may be removed from the electronic device 1A before the electronic device 1A leaves the factory. In the embodiment, although each scan switch circuit 60 is coupled to a plurality of scan lines $S_1$ to $S_N$, in other embodiments of the present disclosure, one scan switch circuit 60 may be coupled to the odd-numbered scan lines (such as: $S_1$), and another scan switch circuit 60 may be coupled to the even-numbered scan lines (such as: $S_2$). In the embodiment, although the driving circuit 20 comprises two scan switch circuits 60, in other embodiments, the driving circuit 20 may comprise a single scan switch circuit 60.

In the above-mentioned embodiment, the driving element 30 uses a dual-channel architecture with dual data clock signals CKH1 and CKH2 and dual data signals S1 and S2 to transmit the data to the active area 80 to refresh the images of the active area 80. However, the present disclosure is not limited thereto. In other embodiments of the present disclosure, the driving element 30 may use a single-channel, three-channel, or more channels architecture to transmit the data to the active area 80.

In addition, in order to effectively control the power consumption of the electronic device 1A, the maximum amplitude of at least one of the data clock signals CK1 and CK2 and the scan clock signals CKV1 and CKV2 output from the driving element 30 will be controlled, making the maximum amplitude greater than or equal to 8 volts and less than or equal to 22 volts. The maximum amplitude of a voltage signal is equal to the maximum value of the voltage signal minus the minimum value of the voltage signal. More specifically, the maximum amplitude of the data clock signal CKH1 is equal to the maximum value of the data clock signal CKH1 minus the minimum value of the data clock signal CKH1; the maximum amplitude of the data clock signal CKH2 is equal to the maximum value of the data clock signal CKH2 minus the minimum value of the data clock signal CKH2; the maximum amplitude of the scan clock signal CKV1 is equal to the maximum value of the scan clock signal CKV1 minus the minimum value of the scan clock signal CKV1; and the maximum amplitude of the scan clock signal CKV2 is equal to the maximum value of the scan clock signal CKV2 minus the minimum value of the scan clock signal CKV2. The maximum amplitudes of the data clock signals CK1 and CK2 and the scan clock signals CKV1 and CKV2 may be the same or different. Assuming that the maximum values of the data clock signals CK1 and CK2 and the scan clock signals CKV1 and CKV2 are all equal to VH, and the minimum values of the data clock signals CK1 and CK2 and the scan clock signals CKV1 and CKV2 are all equal to VL, then the maximum amplitudes of the data clock signals CK1 and CK2 and the scan clock signals CKV1 and CKV2 are all equal to (VH-VL). In this case, the driving element 30 will control (VH-VL) to be greater than or equal to 8 volts and less than or equal to 22 volts. Since the voltages of the data clock signals CK1 and CK2 and the scan clock signals CKV1 and CKV2 are periodically switched between the maximum value VH and the minimum value VL, when the switching frequency of the data clock signals CK1 and CK2 and the scan clock signals CKV1 and CKV2 is fixed, the power consumption of the electronic device 1A due to the data clock signals CK1 and CK2 and the scan clock signals CKV1 and CKV2 is positively correlated with the maximum amplitude (VH-VL) of the data clock signals CK1 and CK2 and the scan clock signals CKV1 and CKV2. Therefore, by controlling the maximum amplitude (VH-VL) of the data clock signals CK1 and CK2 and the scan clock signals CKV1 and CKV2, the power consumption of the electronic device 1A due to the data clock signals CK1 and CK2 and the scan clock signals CKV1 and CKV2 would be effectively controlled. Furthermore, the present disclosure will optimize the settings of the maximum and minimum values of the data clock signals CK1 and CK2 and the scan clock signals CKV1 and CKV2, so that the voltages of the data clock signals CK1 and CK2 and the scan clock signals CKV1 and CKV2 are sufficient to drive the relevant electronic components in the electronic device 1A to ensure that the electronic device 1A may operate normally, while the voltages of the data clock signals CK1 and CK2 and the scan clock signals CKV1 and CKV2 will not be set too high to cause unnecessary power consumption. The maximum amplitude of the data clock signals CK1 and CK2 and the scan clock signals CKV1 and CKV2 is controlled to be greater than or equal to 8 volts and less than or equal to 22 volts, so that the electronic device 1A may operate normally and have low power consumption. The above-mentioned optimization process will be explained in the following embodiments. In addition, as mentioned above, the maximum amplitude of at least one of the data clock signals CK1 and CK2 and the scan clock signals CKV1 and CKV2 output from the driving element 30 will be controlled. In other words, the driving element 30 may control the maximum amplitude of all the data clock signals CK1 and CK2 and the scan clock signals CKV1 and CKV2, so that the maximum amplitude of the data clock signals CK1 and CK2 and the scan clock signals CKV1 and CKV2 are all greater than or equal to 8 volts and less than or equal to 22 volts. The driving element 30 may only control the maximum amplitude of some of the data clock signals CK1 and CK2 and the scan clock signals CKV1 and CKV2. For example, the driving element 30 may only control the maximum amplitude of the data clock signals CKH1 and CKH2, and make the maximum amplitude of the data clock signals CKH1 and CKH2 both greater than or equal to 8 volts and less than or equal to 22 volts. In other embodiments, tailored to specific requirements, the driving element 30 selectively modulates the maximum amplitude of at least one of the data clock signals CK1 and CK2 and the scan clock signals CKV1 and CKV2, thereby optimizing energy consumption.

Figure 2:
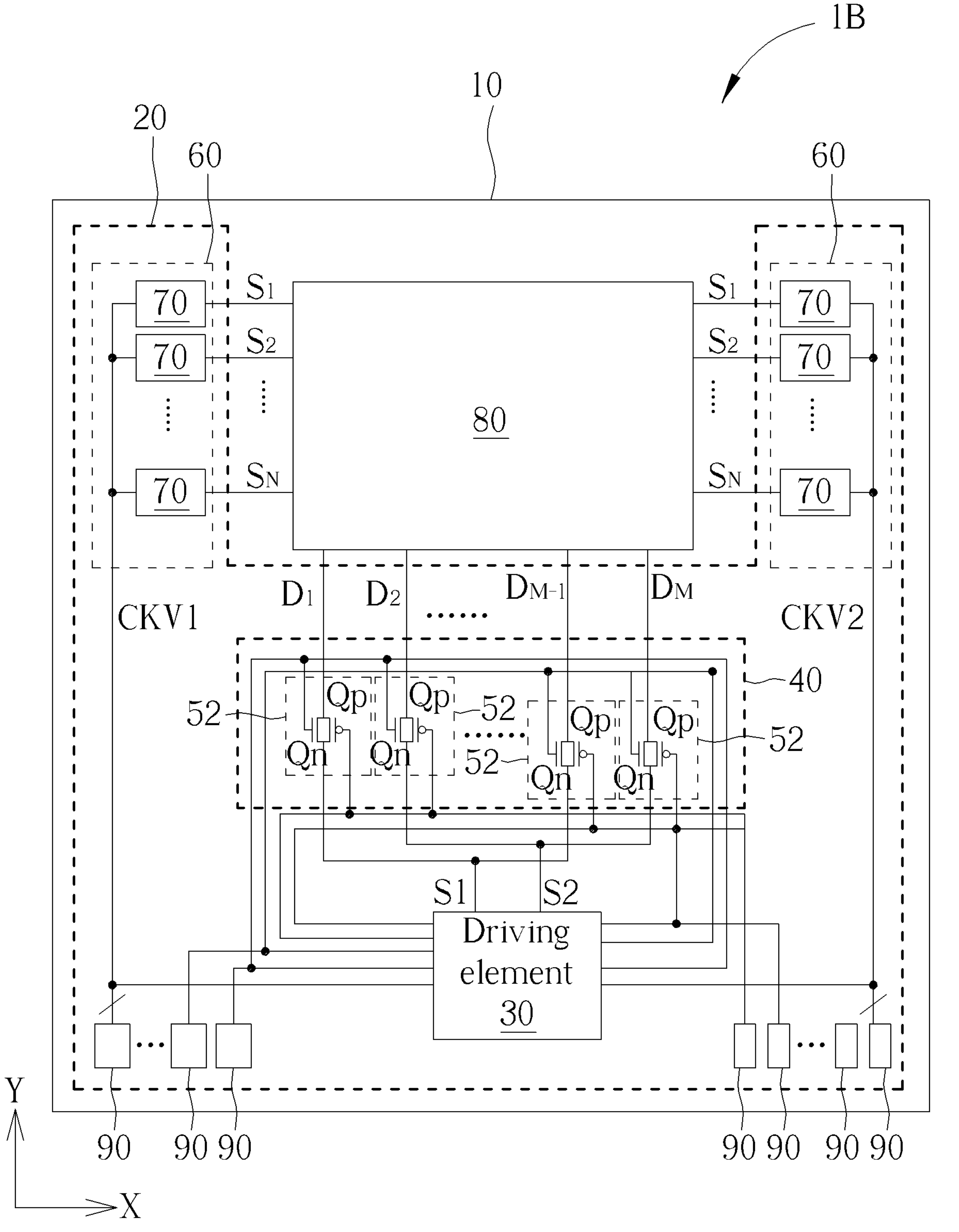
FIG. 2 is a schematic diagram of an electronic device according to another embodiment of the disclosure.

Please refer to FIG. 2, which is a schematic diagram of another embodiment of an electronic device 1B of the present disclosure. The difference between the electronic device 1B and the electronic device 1A is that the plurality of data switch elements 50 of the data switch circuit 40 of the electronic device 1A are replaced by a plurality of switch elements 52 of the data switch circuit 40 of the electronic device 1B. Each switch element 52 comprises a transmission gate (TG) composed of a PMOS transistor Qp and an NMOS transistor Qn. The gate of the PMOS transistor Qp serves as a first control end of the switch element 52, and the gate of the NMOS transistor Qn serves as a second control end of the switch element 52, and the first control end and the second control end are coupled to the driving element 30. The switch element 52 further comprises a first end (e.g., the source) coupled to the driving element 30, and the driving element 30 provides data signals S1 and S2 at the first end of the switch element 52. Assuming that the voltage levels of the data signals S1 and S2 are equal to a data voltage VDATA, a threshold voltage of the PMOS transistor Qp is equal to Vth_p, a threshold voltage of the NMOS transistor Qn is equal to Vth_n, and the maximum amplitude of the data clock signals CKH1 and CKH2 is equal to ΔV, then the maximum amplitude ΔV of a first voltage signal (e.g., one of the data clock signals CKH1 and CKH2) output from the driving element 30 to the first control end of the switch element 52 satisfies the following equation (1):

$$(VDATA\times 2+\text{Vth\_p}-\text{Vth\_n})\leq \Delta V\leq (VDATA\times 2+8\text{ volts}) \tag{1}$$

Where, the data voltage VDATA may be greater than or equal to 4 volts and less than or equal to 7 volts;

The threshold voltage Vth_p may be greater than or equal to 0 volts and less than or equal to 2 volts; and The threshold voltage Vth_n may be greater than or equal to 0 volts and less than or equal to 2 volts.

Under the above conditions, the equation (1) may be simplified to the following equation (2):

$$8\text{ volts}\leq \Delta V\leq 22\text{ volts} \tag{2}$$

Similarly, the maximum amplitude ΔV' of a second voltage signal (e.g., another one of the data clock signals CKH1 and CKH2) output from the driving element 30 to the second control end of the switch element 52 satisfies the following equation (3):

$$(VDATA\times 2+\text{Vth\_p}-\text{Vth\_n})\leq \Delta V'\leq (VDATA\times 2+8\text{ volts}) \tag{3}$$

Here, the data voltage VDATA may be greater than or equal to 4 volts and less than or equal to 7 volts;

The threshold voltage Vth_p may be greater than or equal to 0 volts and less than or equal to 2 volts; and The threshold voltage Vth_n may be greater than or equal to 0 volts and less than or equal to 2 volts.

Under the above conditions, the equation (3) may be simplified to the following equation (4):

$$8\text{ volts}\leq \Delta V'\leq 22\text{ volts} \tag{4}$$

That is, the maximum amplitude ΔV of the first voltage signal may be roughly equal to the maximum amplitude ΔV' of the second voltage signal.

Figure 3:
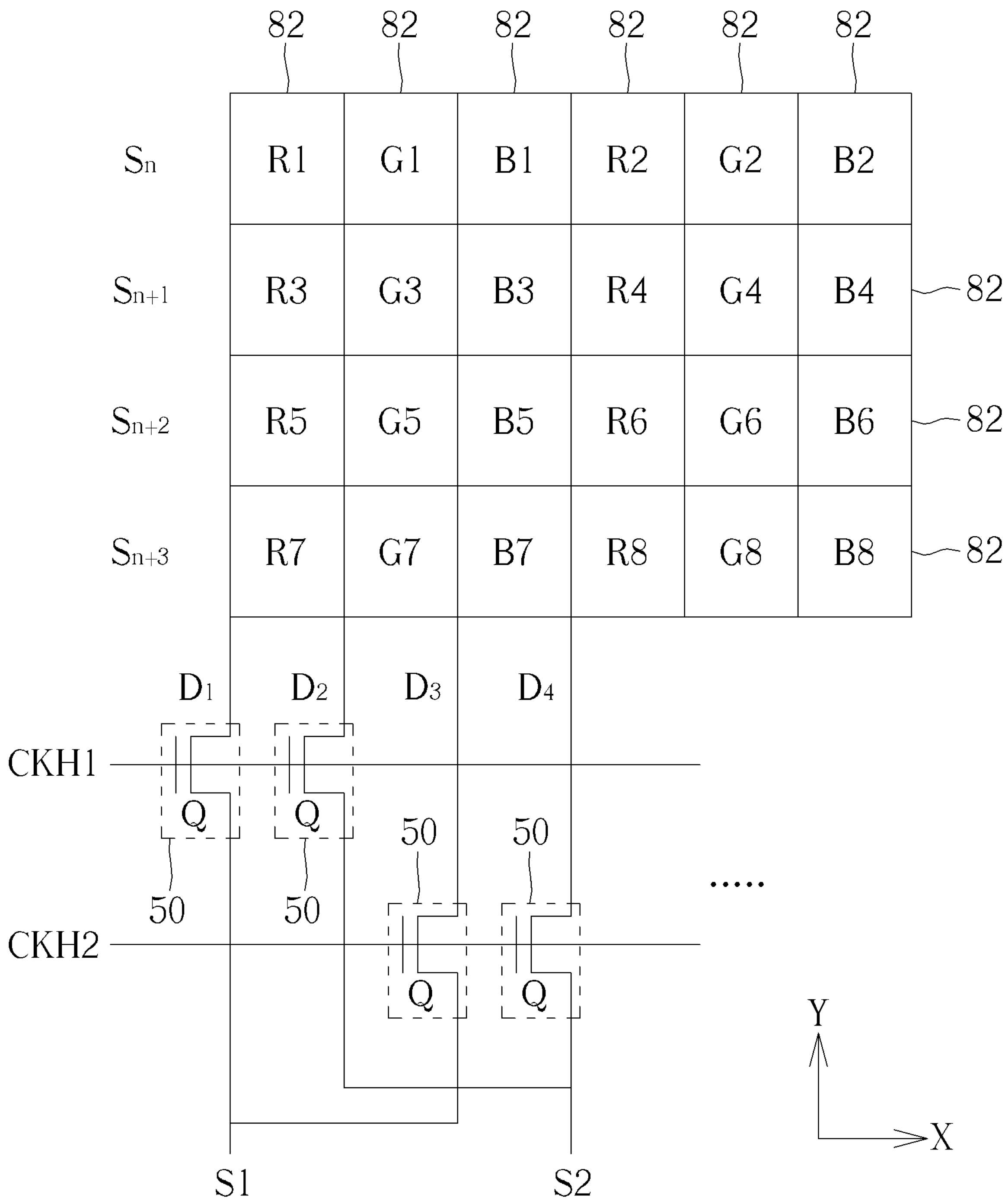
FIG. 3 is a schematic diagram of part of the circuit of the electronic device in FIG. 1.
Figure 4:
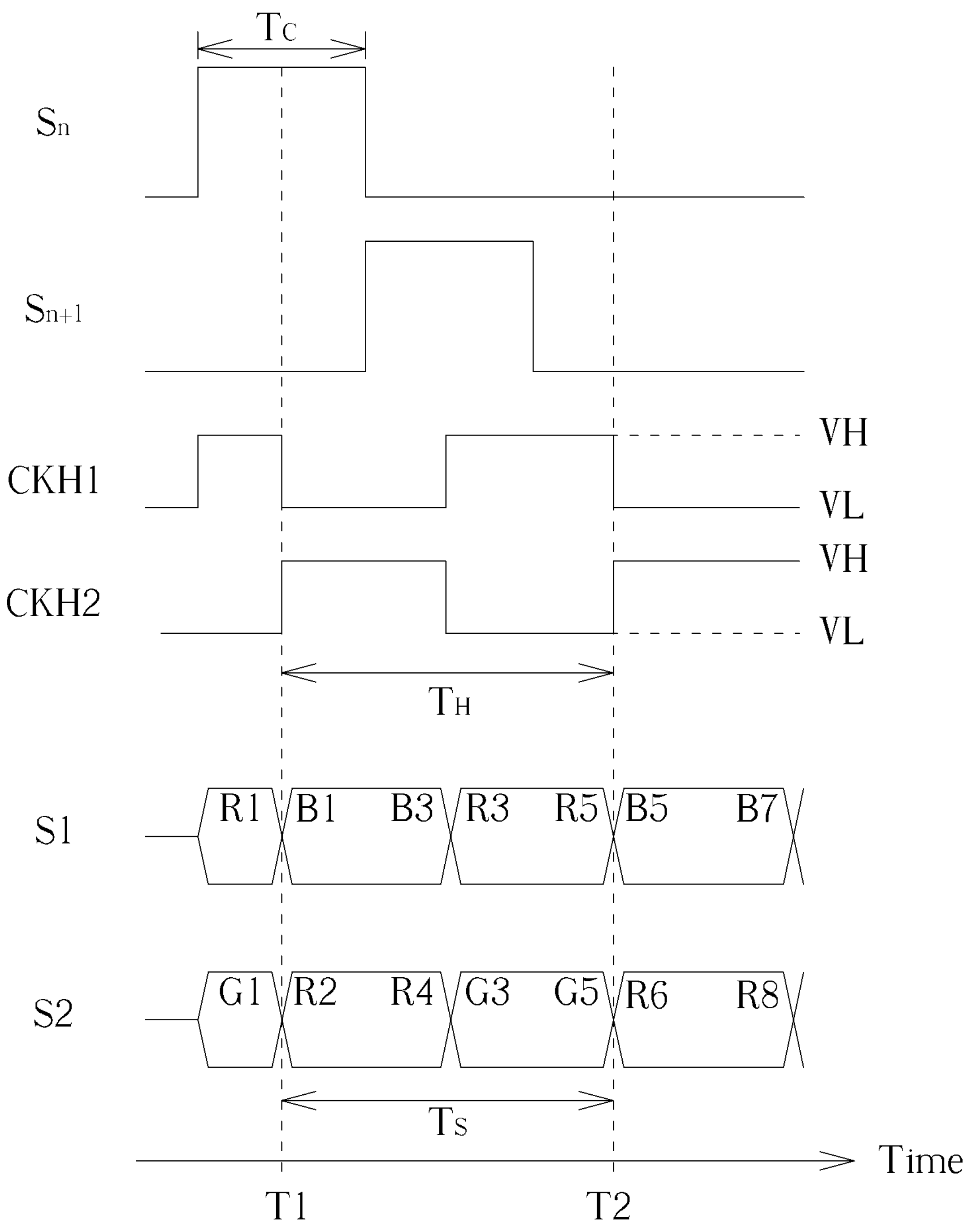
FIG. 4 is a timing diagram of the signals of the circuit shown in FIG. 3.

Please refer to FIGS. 3 and 4. FIG. 3 is a schematic diagram of part of the circuit of the electronic device 1A in FIG. 1, and FIG. 4 is a timing diagram of the signals of the circuit shown in FIG. 3. The circuit shown in FIG. 3 comprises several subpixels 82 in the active area 80 and several data switch elements 50 in the data switch circuit 40. The subpixels 82 in FIG. 3 comprise a plurality of red subpixels R1 to R8, a plurality of green subpixels G1 to G8, and a plurality of blue subpixels B1 to B8, and the subpixels 82 are coupled to the scan lines $S_n$ to $S_{n+3}$ and the data lines $D_1$ to $D_4$. The data line $D_1$ is coupled to the subpixels 82 (such as: the subpixels R1, R3, R5, and R7) in the first column, and the data line $D_2$ is coupled to the subpixels 82 (such as: subpixels G1, G3, G5, and G7) in the second column, and so on. Furthermore, the scan line $S_n$ is coupled to the subpixels 82 (such as: subpixels R1, G1, B1, R2, G2, and B2) in the first row, and the scan line $S_{n+1}$ is coupled to the subpixels 82 (such as: subpixels R3, G3, B3, R4, G4, and B4) in the second row, and so on. In addition, the data clock signals CKH1 and CKH2 will alternately switch between the maximum value VH and the minimum value VL. When the voltage of the data clock signal CKH1 is equal to the maximum value VH, and the voltage of the data clock signal CKH2 is equal to the minimum value VL, the data switch elements 50 coupled to the data lines $D_1$ and $D_2$ will be turned on, and the data switch elements 50 coupled to the data lines $D_3$ and $D_4$ will be turned off, so that the data signal S1 is transmitted to the data line $D_1$ but not transmitted to the data line $D_3$, and the data signal S2 is transmitted to the data line $D_2$ but not transmitted to the data line $D_4$. When the voltage of the data clock signal CKH1 is equal to the minimum value VL, and the voltage of the data clock signal CKH2 is equal to the maximum value VH, the data switch elements 50 coupled to the data lines $D_1$ and $D_2$ will be turned off, and the data switch elements 50 coupled to the data lines $D_3$ and $D_4$ will be turned on, so that the data signal S1 is transmitted to the data line $D_3$ but not transmitted to the data line $D_1$, and the data signal S2 is transmitted to the data line $D_4$ but not transmitted to the data line $D_2$. With the scan lines $S_n$ to $S_{n+3}$ being sequentially at a high level, the data of the subpixels 82 will be refreshed by the data signals S1 and S2. The voltage signal of the scan lines $S_n$ to $S_{n+3}$ serves as a scan signal, which has a scan pulse width $T_C$. Because the scan lines $S_n$ to $S_{n+3}$ are sequentially at a high level, the subpixels 82 are sequentially refreshed. The order for refreshing the subpixels 82 with the data signal S1 is: R1→B1→B3→R3→R5→B5→B7; and the order for refreshing the subpixels 82 with the data signal S2 is: G1→R2→R4→G3→G5→R6→R8. If the active area 80 displays a solid color image, when a signal switching period $T_H$ of the data clock signals CKH1 and CKH2 is equal to twice the scan pulse width $T_C$, a data switching period $T_S$ of the data signals S1 and S2 is approximately equal to twice the scan pulse width $T_C$. When the active area 80 displays a solid color image, and the signal switching period $T_H$ of the data clock signals CKH1 and CKH2 is equal to the scan pulse width $T_C$, the data switching period $T_S$ of the data signals S1 and S2 is approximately equal to the scan pulse width $T_C$. Therefore, as shown in FIG. 4, when the signal switching period $T_H$ of the data clock signals CKH1 and CKH2 is set to be equal to twice the scan pulse width $T_C$, the data switching period $T_S$ will be twice the data switching period $T_S$ when the signal switching period $T_H$ is set to be equal to the scan pulse width $T_C$. Since the power consumption of the electronic device 1A due to the data clock signals CKH1 and CKH2 is inversely proportional to the signal switching period $T_H$, when the signal switching period $T_H$ is doubled, the power consumption of the electronic device 1A due to the data clock signals CKH1 and CKH2 will be halved. Furthermore, because the data switching period $T_S$ is doubled, the power consumption of the electronic device 1A due to the data signals S1 and S2 will also be halved when the active area 80 displays a solid color image. In addition, as shown in FIG. 4, between the two time points T1 and T2 corresponding to two adjacent rising edges of the data clock signal CKH2, the scan signal on the scan line $S_n$ has a falling edge, and the scan signal on the scan line $S_{n+1}$ has a rising edge and a falling edge.

Figure 5:
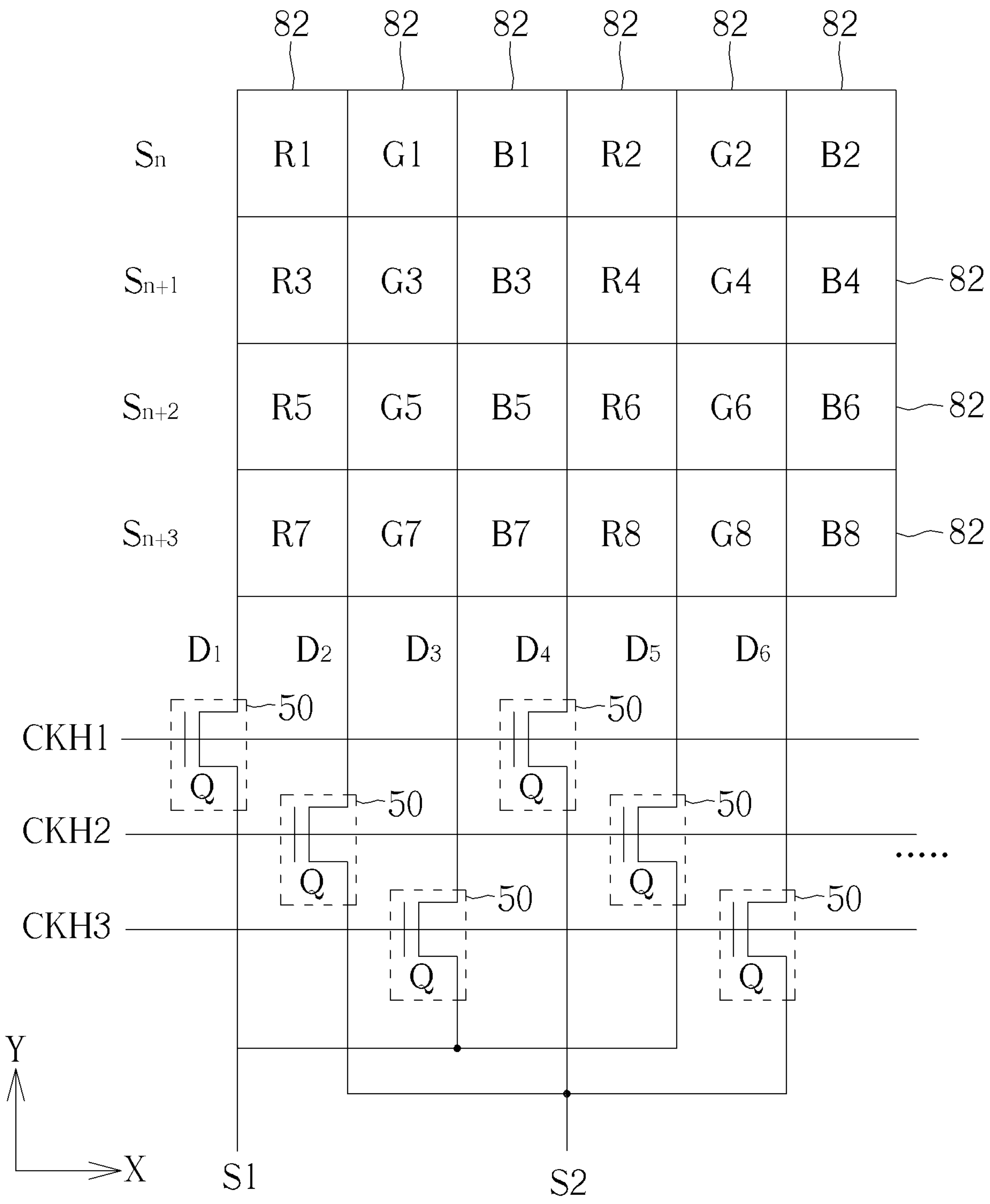
FIG. 5 is a schematic diagram of part of the circuit of an electronic device according to an embodiment of the disclosure.
Figure 6:
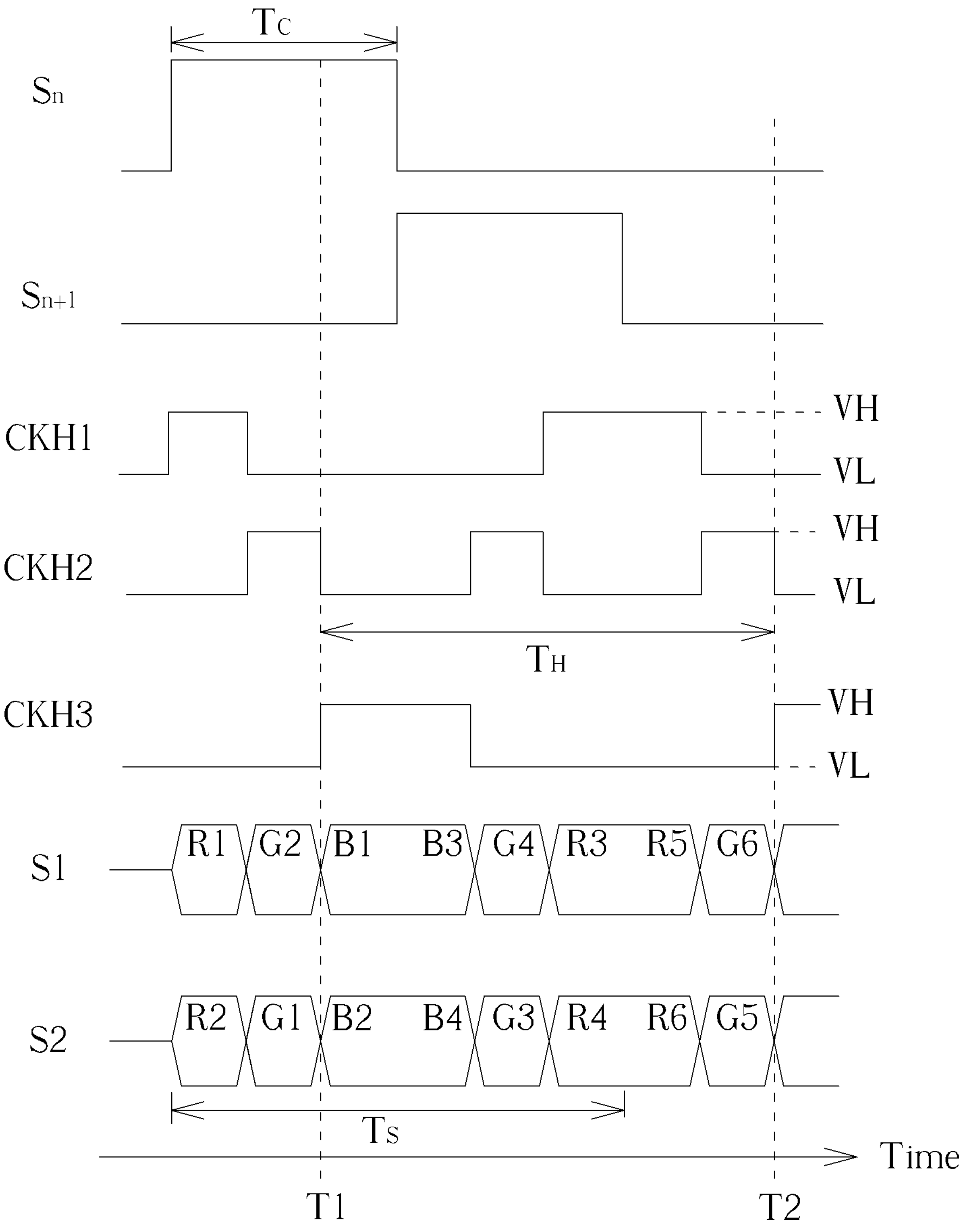
FIG. 6 is a timing diagram of the signals of the circuit shown in FIG. 5.

Please refer to FIGS. 5 and 6. FIG. 5 is a schematic diagram of part of the circuit of an electronic device according to an embodiment of the present disclosure, and FIG. 6 is a timing diagram of signals of the circuit shown in FIG. 5. In the embodiment, the electronic device uses three data clock signals CKH1, CKH2, and CKH3 and two data signals S1 and S2 to drive the data switch elements 50 to refresh the states of the subpixels 82. The subpixels 82 marked as R1 to R8 are red subpixels, the subpixels 82 marked as G1 to G8 are green subpixels, and the subpixels 82 marked as B1 to B8 are blue subpixels. The data clock signals CKH1, CKH2, and CKH3 will alternately switch between the maximum value VH and the minimum value VL. When the voltage of the data clock signal CKH1 is equal to the maximum value VH, and the voltage of the data clock signals CKH2 and CKH3 is equal to the minimum value VL, the data switch elements 50 coupled to the data lines $D_1$ and $D_4$ will be turned on, and the data switch elements 50 coupled to the data lines $D_2$, $D_3$, $D_5$, and $D_6$ will be turned off, so that the data signal S1 is transmitted to the data line $D_1$ but not transmitted to the data lines $D_3$ and $D_5$, and the data signal S2 is transmitted to the data line $D_4$ but not transmitted to the data lines $D_2$ and $D_6$. When the voltage of the data clock signal CKH2 is equal to the maximum value VH, and the voltage of the data clock signals CKH1 and CKH3 is equal to the minimum value VL, the data switch elements 50 coupled to the data lines $D_2$ and $D_5$ will be turned on, and the data switch elements 50 coupled to the data lines $D_1$, $D_3$, $D_4$, and $D_6$ will be turned off, so that the data signal S1 is transmitted to the data line $D_5$ but not transmitted to the data lines $D_1$ and $D_3$, and the data signal S2 is transmitted to the data line $D_2$ but not transmitted to the data lines $D_4$ and $D_6$. When the voltage of the data clock signal CKH3 is equal to the maximum value VH, and the voltage of the data clock signals CKH1 and CKH2 is equal to the minimum value VL, the data switch elements 50 coupled to the data lines $D_3$ and $D_6$ will be turned on, and the data switch elements 50 coupled to the data lines $D_1$, $D_2$, $D_4$, and $D_5$ will be turned off, so that the data signal S1 is transmitted to the data line $D_3$ but not transmitted to the data lines $D_1$ and $D_5$, and the data signal S2 is transmitted to the data line $D_6$ but not transmitted to the data lines $D_2$ and $D_4$. With the scan lines $S_n$ to $S_{n+3}$ being sequentially at a high level, the data of the subpixels 82 will be refreshed by the data signals S1 and S2. The signals transmitted by the scan lines $S_n$ to $S_{n+3}$ serve as scan signals, which have a scan pulse width $T_C$. Because the scan lines $S_n$ to $S_{n+3}$ are sequentially at a high level, the subpixels 82 are sequentially refreshed. The order for refreshing the subpixels 82 with the data signal S1 is: R1→G2→B1→B3→G4→R3→R5→G6; and the order for refreshing the subpixels 82 with the data signal S2 is: R2→G1→B2→B4→G3→R4→R6→G5. If the active area 80 displays a solid color image, because the data of subpixels B1 and B3 are the same, the data voltage of the data signal S1 does not need to be changed during the period in which the data signal S1 transmits the data of subpixels B1 and B3 after time point T1. Therefore, the power consumption of the electronic device due to the change in the data voltage of the data signal S1 may be reduced. Similarly, when the active area 80 displays a solid color image, the data of subpixel R3 will be the same as the data of the subpixel R5, the data of subpixel B2 will be the same as the data of subpixel B4, and the data of subpixel R4 will be the same as the data of subpixel R6. In this case, as shown in FIG. 6, two blue subpixels with the same data (such as B2 and B4) will be updated continuously in the sequence, and two red subpixels with the same data (such as R3 and R5) will also be updated continuously in the sequence. Therefore, the number of times the data voltage of data signals S1 and S2 needs to be changed will be reduced, which can reduce the power consumption generated by the electronic device due to the data signals S1 and S2. Additionally, according to the above-mentioned driving method, the signal switching period $T_H$ of the data clock signals CKH1 and CKH3 would be extended to twice the scan pulse width $T_C$, which can relatively reduce the power consumption generated by the electronic device due to the data clock signals CKH1 and CKH3. Furthermore, as shown in FIG. 6, between the two time points T1 and T2 corresponding to the two adjacent rising edges of the data clock signal CKH3, the scan signal on scan line $S_n$ has a falling edge, while the scan signal on scan line $S_{n+1}$ has a rising edge and a falling edge.

Figure 7:
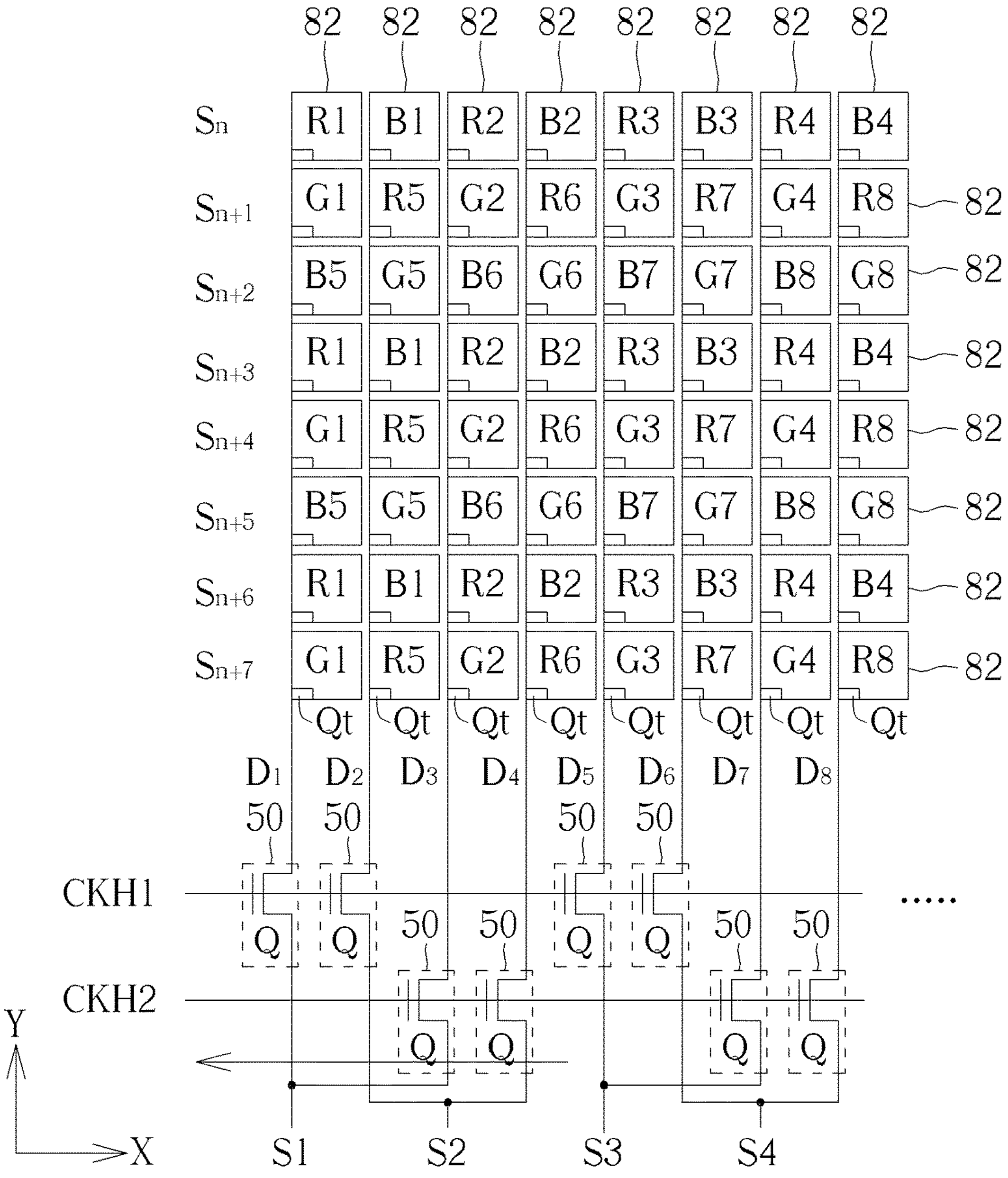
FIG. 7 is a schematic diagram of part of the circuit of an electronic device according to another embodiment of the disclosure.
Figure 8:
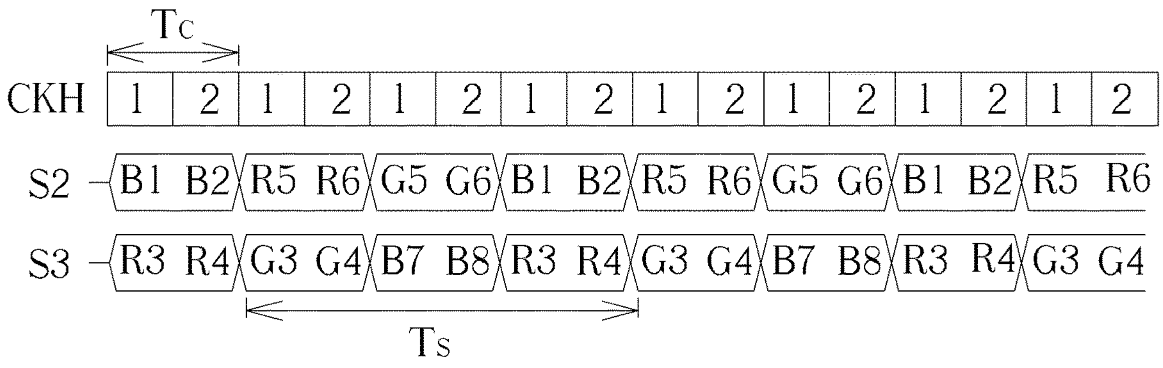
FIG. 8 is a timing diagram of the signals of the circuit shown in FIG. 7.

Please refer to FIGS. 7 and 8. FIG. 7 is a schematic diagram of portion of the circuit of an embodiment according to an embodiment of the present disclosure, and FIG. 8 is a timing diagram of signals of the circuit shown in FIG. 7. In FIG. 8, the numbers 1 and 2 corresponding to CKH represent the periods when the voltage of data clock signals CKH1 and CKH2 is equal to the maximum value VH. In detail, when the value corresponding to CKH is 1, the voltage of data clock signal CKH1 is equal to the maximum value VH, and the voltage of data clock signal CKH2 is equal to the minimum value VL. When the value corresponding to CKH is 2, the voltage of data clock signal CKH2 is equal to the maximum value VH, and the voltage of data clock signal CKH1 is equal to the minimum value VL. In the embodiment, the electronic device uses two data clock signals CKH1 and CKH2 and four data signals S1 to S4 to drive the data switch elements 50 to refresh the states of the subpixels 82. The subpixels 82 marked as R1 to R8 in FIG. 7 are red subpixels, the subpixels 82 marked as G1 to G8 are green subpixels, and the subpixels 82 marked as B1 to B8 are blue subpixels. The arrangements of subpixels 82 of each color in FIG. 7 are different from the arrangements of the subpixels 82 in FIG. 5. In addition, each subpixel 82 is coupled to a pixel switch Qt. A first end of pixel switch Qt is coupled to the subpixel 82, a second end of pixel switch Qt is coupled to one of the data lines $D_1$ to $D_8$, and a control end of pixel switch Qt is coupled to one of the scan lines $S_n$ to $S_{n+7}$. In the embodiment, the data signals S2 and S3 transmit the data of six subpixels 82 in each data switching period $T_S$. The data switching period $T_S$, for the same color data signal, is approximately equal to three times of the scan pulse width $T_C$. Therefore, in the embodiment, the power consumption of the electronic device caused by the data clock signals CKH1 and CKH2 can also be further reduced. The signals transmitted by the scan lines $S_n$ to $S_{n+7}$ serve as scan signals, which have the scan pulse width $T_C$. Because the scan lines $S_n$ to $S_{n+7}$ are sequentially at a high level, the subpixels 82 are sequentially refreshed. For the subpixels 82 in the first row to third row, the order for refreshing the subpixels 82 with the data signal S2 is: B1→B2→R5→R6→G5→G6; and the order for refreshing the subpixels 82 with the data signal S3 is: R3→R4→G3→G4→B7→B8. If the active area 80 displays a solid color image, then the data of subpixels B1 and B2 will be the same, the data of subpixels R5 and R6 will be the same, the data of subpixels G5 and G6 will be the same, the data of subpixels R3 and R4 will be the same, the data of subpixels G3 and G4 will be the same, and the data of subpixels B7 and B8 will be the same. In this case, as shown in FIG. 8, two subpixels with the same color (such as B1 and B2) will be refreshed consecutively with the same data voltage in the sequence. Therefore, the number of times the data voltage of data signals S2 and S3 needs to be changed will be reduced, which can reduce the power consumption of the electronic device caused by the data signals S2 and S3. The operations related to the other two data signals S1 and S4 are also similar to those related to the data signals S2 and S3. Therefore, the power consumption of the electronic device caused by data signals S1 and S4 can also be reduced accordingly.

Figure 9:
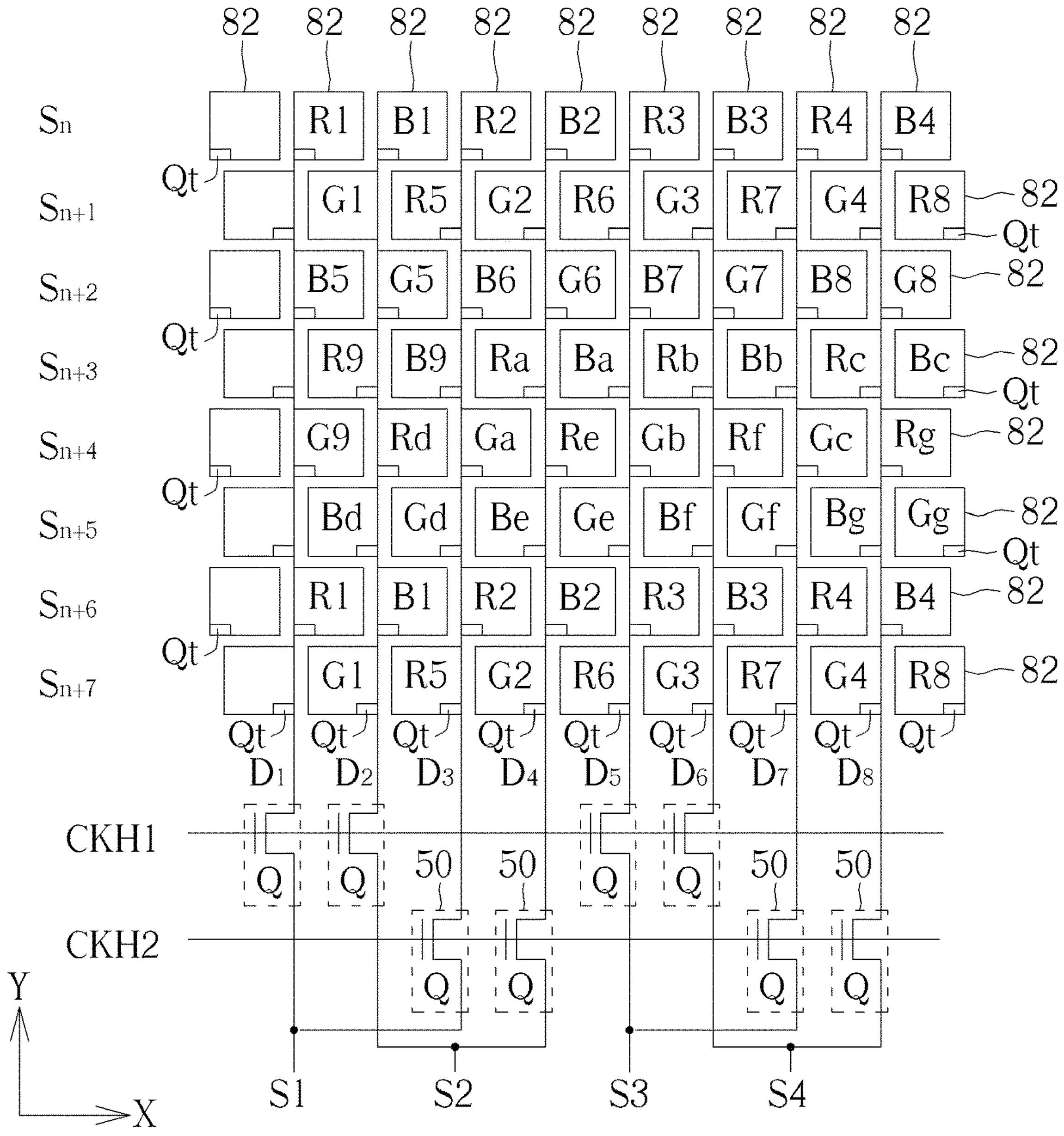
FIG. 9 is a schematic diagram of part of the circuit of another electronic device in another embodiment of the disclosure.
Figure 10:
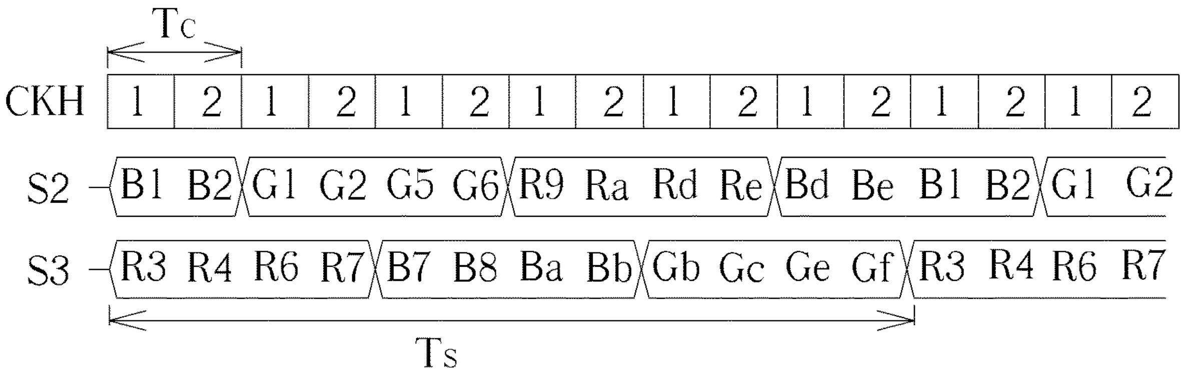
FIG. 10 is a timing diagram of the signals of the circuit shown in FIG. 9.

Please refer to FIGS. 9 and 10. FIG. 9 is a schematic diagram of part of the circuit of an electronic device according to an embodiment of the present disclosure, and FIG. 10 is a timing diagram of the signals of the circuit shown in FIG. 9. In FIG. 10, the numbers 1 and 2 corresponding to CKH represent the periods when the voltages of the data clock signals CKH1 and CKH2 are equal to the maximum value VH. When the value corresponding to CKH is 1, the voltage of the data clock signal CKH1 is equal to the maximum value VH, and the voltage of the data clock signal CKH2 is equal to the minimum value VL. When the value corresponding to CKH is 2, the voltage of the data clock signal CKH2 is equal to the maximum value VH, and the voltage of the data clock signal CKH1 is equal to the minimum value VL. In the embodiment, the electronic device uses two data clock signals CKH1 and CKH2 and four data signals S1 to S4 to drive the data switch elements 50 to refresh the states of the subpixels 82. The subpixels 82 marked as R1 to R9 and Ra to Rg in FIG. 9 are red subpixels, the subpixels 82 marked as G1 to G9 and Ga to Gg are green subpixels, and the subpixels 82 marked as B1 to B9 and Ba to Bg are blue subpixels. The arrangements of subpixels 82 of each color in FIG. 9 are different from those in FIG. 5. In addition, each subpixel 82 is coupled to a pixel switch Qt, a first end of the pixel switch Qt is coupled to the subpixel 82, a second end of the pixel switch Qt is coupled to one of the data lines $D_1$ to $D_8$, and a control end of the pixel switch Qt is coupled to one of the scan lines $S_n$ to $S_{n+7}$. Unlike the circuit shown in FIG. 7, in FIG. 9, each of the data lines $D_1$ to $D_8$ alternately couples with the pixel switches Qt in two adjacent columns, and the subpixels 82 in the first column of FIG. 9 are dummy subpixels. Dummy subpixels are, for example, subpixels that do not receive signals, do not display, or are blocked by other components so that users cannot see them. In the embodiment, because the data signals S2 and S3 transmit the data of twelve subpixels 82 in each data switching period $T_S$, the data switching period $T_S$ is approximately equal to six times the scan pulse width $T_C$. Therefore, in the embodiment, the power consumption of the electronic device due to the data clock signals CKH1 and CKH2 may be further reduced. The signals transmitted by the scan lines $S_n$ to $S_{n+7}$ serves as scan signals, which have a scan pulse width $T_C$. Because the scan lines $S_n$ to $S_{n+7}$ are sequentially at a high level, the subpixels 82 are sequentially refreshed. For the subpixels 82 in the first row to sixth row, the order for refreshing the subpixels 82 with the data signal S2 is: B1→B2→G1→G2→G5→G6→R9→Ra→Rd→Re→Bd→Be; and the order for refreshing the subpixels 82 with the data signal S3 is: R3→R4→R6→R7→B7→B8→Ba→Bb→Gb→Gc→Ge→Gf. If the effective area 80 displays a solid color image, then the data of subpixels G1, G2, G5, and G6 will be the same; the data of subpixels R9, Ra, Rd, and Re will be the same; the data of subpixels R3, R4, R6, and R7 will be the same; the data of subpixels B7, B8, Ba, and Bb will be the same; and the data of subpixels Gb, Gc, Ge, and Gf will be the same. In this case, four subpixels with the same color (such as G1, G2, G5, and G6) will be refreshed consecutively with the same data voltage in the sequence. Therefore, the number of times the data voltage of data signals S2 and S3 needs to be changed will be reduced, which can reduce the power consumption of the electronic device caused by the data signals S2 and S3. The operations related to the other two data signals S1 and S4 are also similar to the operations related to the data signals S2 and S3. Therefore, the power consumption of the electronic device caused by data signals S1 and S4 can also be reduced accordingly.

The above-mentioned embodiments disclosed herein can effectively control the power consumption of the electronic device by controlling the maximum amplitude of at least one of the data clock signals CK1 and CK2 and the scan clock signals CKV1 and CKV2 output from the driving element 30. Moreover, by changing the driving order of the voltage signals CKH1 and CKH2, the switching frequency of the voltage signals CKH1 and CKH2 and the data signals S1 and S2 can be reduced, further reducing the power consumption of the electronic device. In addition, by changing the arrangement of the color subpixels, the switching frequency of the data signals S1 and S2 can be reduced, further reducing the power consumption of the electronic device. Additionally, by changing the driving order of the color subpixels, the switching frequency of the data signals S1 and S2 can be reduced, further reducing the power consumption of the electronic device.

Those skilled in the art will readily observe that numerous modifications and alterations of the device and method may be made while retaining the teachings of the disclosure.

Accordingly, the above disclosure should be construed as limited only by the metes and bounds of the appended claims.

What is claimed is:

1. An electronic device, comprising:

a substrate;

a first signal line disposed on the substrate, wherein the first signal line is a data line; and a driving circuit disposed on the substrate and coupled to the first signal line, and comprising:

at least one data switch element, wherein the at least one data switch element comprises a first control end and a first end; and a driving element coupled to the first control end and configured to provide a first data clock signal at the first control end, wherein the first data clock signal has a first maximum amplitude;

wherein the first maximum amplitude is greater than or equal to 8 volts and less than or equal to 22 volts; and wherein the first end of the at least one data switch element is coupled to the driving element, the driving element provides a data voltage VDATA at the first end, and $(VDATA\times 2+Vth\_p-Vth\_n)\leq\Delta V\leq(VDATA\times 2+8\ \text{volts})$, where $\Delta V$ is the first maximum amplitude, and Vth_p and Vth_n are respective threshold voltages of a PMOS transistor and an NMOS transistor in the at least one data switch element.

2. The electronic device of claim 1, wherein the at least one data switch element further comprises a transmission gate.

3. The electronic device of claim 1, wherein the at least one data switch element further comprises a second control end, the driving element is coupled to the second control end and provides a second data clock signal at the second control end, the second data clock signal has a second maximum amplitude, and the second maximum amplitude is greater than or equal to 8 volts and less than or equal to 22 volts.

4. The electronic device of claim 3, wherein the second maximum amplitude is equal to the first maximum amplitude.

5. The electronic device of claim 3, wherein the at least one data switch element further comprises a first end and a second end respectively coupled to the first signal line and the driving element.

6. The electronic device of claim 1 further comprising:

a second signal line disposed on the substrate and coupled to the driving circuit;

a subpixel; and a pixel switch comprising a first end, a second end and a control end, the first end being coupled to the subpixel, the second end being coupled to the first signal line, and the control end being coupled to the second signal line, wherein the second signal line is a scan line.

7. The electronic device of claim 1, wherein the first maximum amplitude is equal to a maximum voltage of the first data clock signal minus a minimum voltage of the first data clock signal.

8. A display device, comprising:

a substrate;

an active area disposed on the substrate;

a first signal line disposed on the substrate, wherein the first signal line is a data line;

a driving circuit disposed on the substrate and coupled to the active area and the first signal line, and configured to drive the active area to display images, the driving circuit comprising:

at least one data switch element, wherein the at least one data switch element comprises a first control end and a first end; and a driving element coupled to the first control end and configured to provide a first data clock signal at the first control end, wherein the first data clock signal has a first maximum amplitude;

wherein the first maximum amplitude is greater than or equal to 8 volts and less than or equal to 22 volts; and wherein the first end of the at least one data switch element is coupled to the driving element, the driving element provides a data voltage VDATA at the first end, and $(VDATA\times 2+Vth\_p-Vth\_n)\leq\Delta V\leq(VDATA\times 2+8\ \text{volts})$, where $\Delta V$ is the first maximum amplitude, and Vth_p and Vth_n are respective threshold voltages of a PMOS transistor and an NMOS transistor in the at least one data switch element.

9. The display device of claim 8, wherein the at least one data switch element further comprises a transmission gate.

10. The display device of claim 8, wherein the at least one data switch element further comprises a second control end, the driving element is coupled to the second control end and provides a second data clock signal at the second control end, the second data clock signal has a second maximum amplitude, and the second maximum amplitude is greater than or equal to 8 volts and less than or equal to 22 volts.

11. The display device of claim 10, wherein the second maximum amplitude is equal to the first maximum amplitude.

12. The display device of claim 10, wherein the at least one data switch element further comprises a first end and a second end respectively coupled to the first signal line and the driving element.

13. The display device of claim 8 further comprising:

a second signal line disposed on the substrate and coupled to the driving circuit;

a subpixel; and a pixel switch comprising a first end, a second end and a control end, the first end being coupled to the subpixel, the second end being coupled to the first signal line, and the control end being coupled to the second signal line, wherein the second signal line is a scan line.

14. The display device of claim 8, wherein the first maximum amplitude is equal to a maximum voltage of the first data clock signal minus a minimum voltage of the first data clock signal.

* * * * *